(12) United States Patent
Cho et al.

(10) Patent No.: US 12,445,739 B2
(45) Date of Patent: Oct. 14, 2025

(54) SINGLE IMAGE SENSOR FOR RESTORING IMAGES CORRESPONDING TO VARIOUS FIELDS OF VIEW

(71) Applicant: SAMSUNG ELECTRONICS CO., LTD., Suwon-si (KR)

(72) Inventors: Yang Ho Cho, Suwon-si (KR); Kiwoo Lee, Suwon-si (KR); Dong Kyung Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 18/121,407

(22) Filed: Mar. 14, 2023

(65) Prior Publication Data
US 2024/0137661 A1 Apr. 25, 2024
US 2024/0236510 A9 Jul. 11, 2024

(30) Foreign Application Priority Data

Oct. 21, 2022 (KR) ........................ 10-2022-0136390

(51) Int. Cl.
*H04N 23/84* (2023.01)
*G06T 5/00* (2024.01)
(Continued)

(52) U.S. Cl.
CPC ............. *H04N 23/843* (2023.01); *G06T 5/00* (2013.01); *G06T 7/90* (2017.01); *H04N 25/11* (2023.01);
(Continued)

(58) Field of Classification Search
CPC .... H04N 23/843; H04N 25/11; H04N 25/134; H04N 25/46; H10F 39/8053;
(Continued)

(56) References Cited

U.S. PATENT DOCUMENTS

| | | | |
|---|---|---|---|
| 5,845,011 A * | 12/1998 | Miyamoto | H04N 1/393 348/240.99 |
| 8,666,162 B1 * | 3/2014 | Vakrat | G06T 3/4015 382/167 |
| 9,148,632 B2 | 9/2015 | Harding et al. | |
| 10,027,901 B2 | 7/2018 | Venkataraman et al. | |

(Continued)

FOREIGN PATENT DOCUMENTS

| | | | |
|---|---|---|---|
| JP | 2013-192214 A | 9/2013 | |
| KR | 10-2021-0130972 A | 11/2021 | |
| WO | WO-2021215795 A1 * | 10/2021 | ............ H04N 23/12 |

*Primary Examiner* — Twyler L Haskins
*Assistant Examiner* — Akshay Trehan
(74) *Attorney, Agent, or Firm* — Sughrue Mion, PLLC

(57) ABSTRACT

An image sensor includes a color filter array including a first color filter including a first number of blue pass filtering elements, the first number of red pass filtering elements, and green pass filtering elements in a first pattern, wherein a number of the green pass filtering elements in the first pattern is twice the first number, and a second color filter including a second number of blue pass filtering elements, the second number of red pass filtering elements, and green pass filtering elements in a second pattern, wherein a number of green pass filtering elements in the second pattern is twice the second number, and the second number is greater than the first number. The second color filter may surround an area of the first color filter.

16 Claims, 12 Drawing Sheets

(51) Int. Cl.
*G06T 7/90* (2017.01)
*H04N 25/11* (2023.01)
*H04N 25/13* (2023.01)
*H04N 25/46* (2023.01)
*H10F 39/00* (2025.01)

(52) U.S. Cl.
CPC ........... *H04N 25/134* (2023.01); *H04N 25/46* (2023.01); *H10F 39/8053* (2025.01); *H10F 39/8063* (2025.01); *G06T 2207/10024* (2013.01); *G06T 2207/20212* (2013.01)

(58) Field of Classification Search
CPC ......... H10F 39/8063; G06T 5/00; G06T 7/90; G06T 2207/10024; G06T 2207/20212
See application file for complete search history.

(56) References Cited

U.S. PATENT DOCUMENTS

| | | | |
|---|---|---|---|
| 10,687,708 B1* | 6/2020 | Vaziri | H04N 9/8205 |
| 11,245,878 B2 | 2/2022 | Galor Gluskin | |
| 2009/0200451 A1* | 8/2009 | Conners | H04N 25/135 |
| | | | 250/226 |
| 2012/0293696 A1* | 11/2012 | Tanaka | H04N 23/843 |
| | | | 348/E9.002 |
| 2015/0085174 A1* | 3/2015 | Shabtay | H04N 23/13 |
| | | | 348/336 |
| 2015/0145950 A1* | 5/2015 | Murphy | H04N 23/69 |
| | | | 348/36 |
| 2016/0219235 A1* | 7/2016 | Kakehi | H10F 39/8063 |
| 2016/0286120 A1* | 9/2016 | Kuo | H04N 23/63 |
| 2021/0120214 A1* | 4/2021 | Byun | H04N 25/778 |

* cited by examiner

SINGLE IMAGE SENSOR FOR RESTORING IMAGES CORRESPONDING TO VARIOUS FIELDS OF VIEW

CROSS-REFERENCE TO RELATED APPLICATION

This application claims priority from Korean Patent Application No. 10-2022-0136390, filed on Oct. 21, 2022, in the Korean Intellectual Property Office, the disclosure of which is incorporated herein by reference in its entirety.

BACKGROUND

1. Field

Methods and apparatuses consistent with embodiments relate to a single image sensor for restoring images corresponding to various fields of view (FOV).

2. Description of Related Art

Due to the development of optical technology and image processing technology, image capturing devices are utilized in a wide variety of fields, such as fields related to multimedia content, security, and recognition. For example, the image capturing device may be mounted on a mobile device, a camera, a vehicle, or a computer to capture an image. In a related art, images with different fields of view (FOV) are captured using a zoom lens. A focal length of the zoom lens is changed as a lens in a lens module is moved, and accordingly a FOV to be captured may vary. In general, a focal length of a lens needs to increase to capture an image corresponding to a narrow FOV using a zoom lens, and accordingly a lens module size may need to be increased. In addition, since the number of lenses included in the zoom lens needs to increase to capture images corresponding to various FOVs without lens aberration, the size, such as a thickness, of the lens module may increase as the magnification of the zoom lens increases.

SUMMARY

One or more example embodiments may address at least the above problems and/or disadvantages and other disadvantages not described above. Also, example embodiments are not required to overcome the disadvantages described above, and an example embodiment may not overcome any of the problems described above.

According to an aspect of an embodiment, there is provided an image sensor including a color filter array including a first color filter including a first number of blue pass filtering elements, the first number of red pass filtering elements, and green pass filtering elements arranged in a first pattern, wherein a number of green pass filtering elements in the first pattern may be twice the first number, and a second color filter including a second number of blue pass filtering elements, the second number of red pass filtering elements, and green pass filtering elements in a second pattern, wherein a number of green pass filtering elements in the second pattern may be twice the second number, the second number may be greater than the first number; a sensing array including first sensing elements arranged in a first sensing region configured to receive light passing through the first color filter, and second sensing elements arranged in a second sensing region configured to receive light passing through the second color filter; and a processor configured to generate sensing data based on a sensing of the first sensing elements and a sensing of the second sensing elements. The second color filter may surround an area of the first color filter.

The processor may be configured to group the first sensing elements based on a first binning size determined based on the first pattern of the first color filter and group the second sensing elements based on a second binning size determined based on the second pattern of the second color filter.

The processor may be configured to generate first sensing data based on the grouped first sensing elements based on the first binning size and generate second sensing data based on the grouped second sensing elements based on the second binning size.

The first sensing data may include a sensing value obtained by summing intensity values sensed by the first sensing elements grouped based on the first binning size. The second sensing data may include a sensing value obtained by summing intensity values sensed by the second sensing elements grouped based on the second binning size.

The image sensor may include a processor further configured to restore a first image corresponding to a first field of view (FOV) based on the first sensing data, and restore a second image corresponding to a second FOV that may extend further than the first FOV, based on the first sensing data and the second sensing data.

In restoring the first image, the processor may be configured to determine pixel values of first pixels constituting the first image from a sensing value obtained by summing intensity values sensed by the first sensing elements grouped based on the first binning size, generate channel images for each color channel from the pixel values of the first pixels, and restore the first image using the channel images.

The second image may include a first partial image corresponding to the first sensing region, and a second partial image corresponding to the second sensing region. In restoring the second image, the processor may be configured to determine pixel values of first pixels based on the grouping of the first sensing elements based on the first binning size, identify second pixels corresponding to sets of plural first pixels which form part of the first partial image, determine pixel values of the second pixels by performing a color interpolation on the pixel values of the first pixels and performing a digital binning on the first pixels, determine pixel values of second pixels which form part of the second partial image based on the grouping of the second sensing elements based on the second binning size, and restore the second image by generating channel images for each color channel from the determined pixel values of the second pixels in the first partial image and the second partial image.

In determining pixel values of the second pixels in a region of the first partial image, the processor may be configured to identify one set of first pixels corresponding to one second pixel forming a part of the first partial image, and determine an intensity value of a color indicated by the one second pixel by interpolating a first pixel a first pixel having a pixel value corresponding to an intensity value of a color other than the color indicated by the one second pixel among the identified one set of first pixels with a pixel value of another first pixel outside of the one set of first pixels and proximate to the first pixel, the pixel value of the another first pixel corresponding to the intensity value of the color indicated by the one second pixel.

The processor may be configured to determine a pixel value of the one second pixel by performing digital binning to sum intensity values of the color indicated by the one second pixel for each of the first pixels corresponding to the one second pixel.

The processor may be configured to determine the pixel values of the second pixels constituting the first partial image by performing a digital binning on the first pixels based on a binning size corresponding to a value obtained by dividing the second binning size by the first binning size.

The color filter array may further include a third color filter including a third number of blue pass filtering elements, a third number of red pass filtering elements, and green pass filtering elements arranged in a third pattern, wherein a number of green pass filtering elements in the third pattern is twice the third number, and wherein the third number may be greater than the second number. The sensing array may further include third sensing elements arranged in a third sensing region configured to receive light passing through the third color filter. The third color filter may surround an area of the second color filter.

The processor may be configured to group the third sensing elements based on a third binning size determined based on the third pattern of the third color filter, and generate third sensing data based on the grouping of the third sensing elements based on the third binning size.

The processor of the image sensor may further configured to restore a third image corresponding to a third FOV, based on first sensing data generated based on a grouping of the first sensing elements based on a first binning size, second sensing data generated based on a grouping of the second sensing elements based on a second binning size, and the third sensing data.

In restoring the third image, the processor may be configured to determine pixel values of first pixels based on the grouping of the first sensing elements based on the first binning size, determine pixel values of third pixels corresponding to a first sensing region of the third image by performing a color interpolation on the pixel values of the first pixels and performing a digital binning on the first pixels, determine pixel values of second pixels based on the grouping of the second sensing elements based on the second binning size, determine pixel values of third pixels corresponding to a second sensing region of the third image by performing a color interpolation on the pixel values of the second pixels and performing a digital binning on the second pixels, and determine pixel values of third pixels corresponding to a third sensing region of the third image based on the grouping of the third sensing elements based on the third binning size.

When the first number is "1", an analog binning operation of the first sensing elements may be excluded.

A size of each of the first color filter, the second color filter, and the third color filter may be determined such that images corresponding to a plurality of FOVs may have the same resolution.

According to another aspect of an embodiment, there is provided a method performed by an image sensor, including sensing, via a sensor array, light passing through a color filter array including a first color filter including a first number of blue pass filtering elements, the first number of red pass filtering elements, and green pass filtering elements arranged in a first pattern, wherein a number of green pass filtering elements in the first pattern is twice the first number, and a second color filter including a second number of blue pass filtering elements, the second number of red pass filtering elements, and green pass filtering elements arranged in a second pattern, wherein a number of green pass filtering elements in the second pattern is twice the second number, the second number may be greater than the first number; and generating, via a processor, first sensing data based on a grouping of first sensing elements arranged in a first sensing region configured to receive light passing through the first color filter, based on a first binning size, and generating second sensing data based on a grouping of second sensing elements arranged in a second sensing region configured to receive light passing through the second color filter, based on a second binning size. The second color filter may surround an area of the first color filter.

The method may further include restoring, via a processor, a first image corresponding to a first FOV based on the first sensing data, and restoring, via a processor, a second image corresponding to a second FOV that may extend further than the first FOV, based on the first sensing data and the second sensing data.

The restoring of the first image may include determining pixel values of first pixels constituting the first image from a sensing value obtained by summing intensity values sensed by the first sensing elements grouped based on the first binning size, generating channel images for each color channel from the pixel values of the first pixels, and restoring the first image using the channel images.

The second image may include a first partial image corresponding to the first sensing region, and a second partial image corresponding to the second sensing region. The restoring of the second image may include determining pixel values of first pixels based on the grouping of the first sensing elements based on the first binning size, identifying second pixels corresponding to sets of plural first pixels which form part of the first partial image and determining pixel values of the second pixels by performing a color interpolation on the pixel values of the first pixels and performing a digital binning on the first pixels; determining pixel values of second pixels which form part of the second partial image based on the grouping of the second sensing elements based on the second binning size; and restoring the second image by generating channel images for each color channel from the determined pixel values of the second pixels in the first partial image and the second partial imave.

Additional aspects of embodiments will be set forth in part in the description which follows and, in part, will be apparent from the description, or may be learned by practice of the disclosure.

BRIEF DESCRIPTION OF THE DRAWINGS

The above and/or other aspects will be more apparent by describing example embodiments with reference to the accompanying drawings, in which.

DETAILED DESCRIPTION

Figure 1:
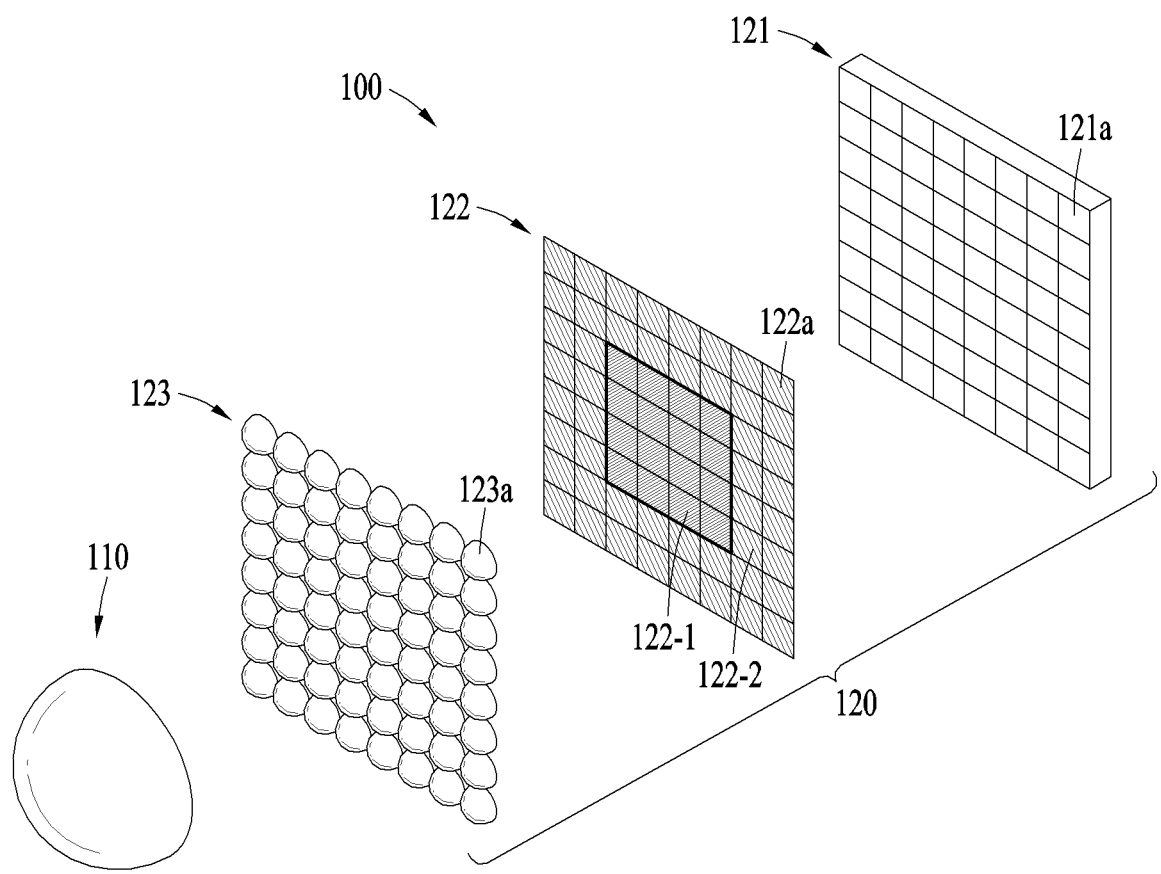
FIGS. 1 and 2 illustrate examples of a structure of an imaging device according to an embodiment.

The following detailed structural or functional description is provided as an example only and various alterations and modifications may be made to embodiments. Accordingly, the embodiments are not construed as limited to the disclosure and should be understood to include all changes, equivalents, replacements, and substitutions which would be apparent to one of ordinary skill in the art in view of the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components. Alternatively, the first component may be directly connected, coupled, or joined to the second component without an intervening component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, and do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the embodiments will be described in detail with reference to the accompanying drawings. When describing the embodiments with reference to the accompanying drawings, like reference numerals refer to like components and a repeated description related thereto will be omitted.

Figure 2:
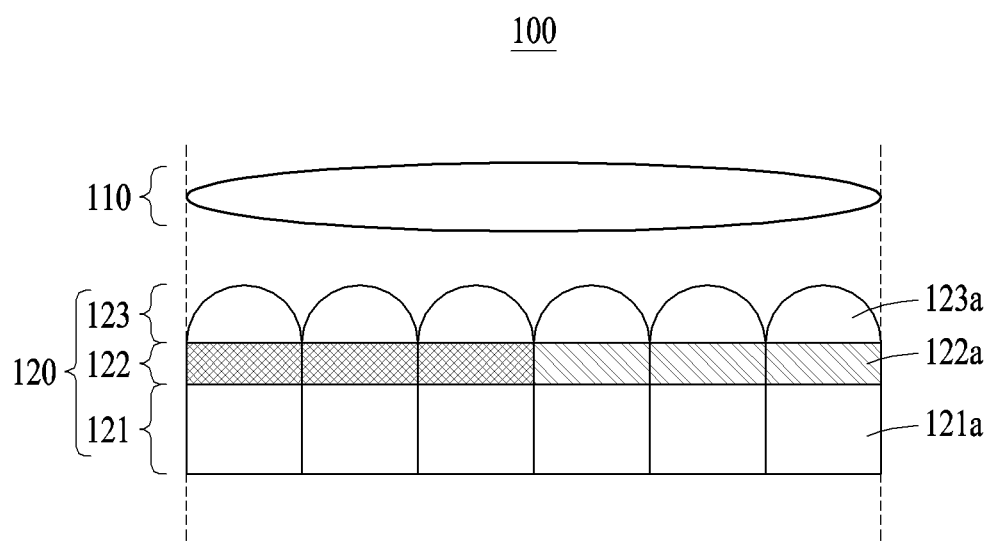

FIGS. 1 and 2 illustrate examples of a structure of an imaging device according to an embodiment. FIG. 1 is a perspective view of an imaging device, and FIG. 2 is a cross-sectional view of the imaging device.

An imaging device 100 may include an imaging lens 110, and an image sensor 120. The image sensor 120 may include optical sensing elements. The optical sensing elements may be arranged along a plane of a sensing array 121 in the image sensor 120. The imaging lens 110 may be a lens to perform an imaging operation.

An optical sensing element (hereinafter, also referred to as a "sensing element") may be an element that senses optical information based on light incident onto the corresponding element, and may output a signal value indicating an intensity of the incident light. The optical sensing element may include, for example, a complementary metal-oxide-semiconductor (CMOS), a charge-coupled device (CCD), and a photodiode.

A picture element (hereinafter, also referred to as a "pixel") may be basic unit information constituting an image, and may indicate optical information obtained by a sensing element sensing light reflected from a physical position on a subject corresponding to a pixel position. The pixel position may a position of a pixel in an image and may follow a pixel coordinate system, and the physical position may follow a world coordinate system.

For reference, a pixel constituting a color image may have a pixel value for a single pixel position. A pixel value may have a plurality of color values (e.g., a red value, a green value, and a blue value in an RGB color system). In a field of a display, a unit pixel constituting a display may include sub-pixels (for example, a red sub-pixel, a green sub-pixel, and a blue sub-pixel in an RGB color system) for a plurality of colors to express color values of one pixel position. In a field of an image sensor, a pixel is not divided into sub-pixels for each color and generally refers to a sensing element (e.g., a photodiode with a color filter disposed at the front) that senses one color value. In addition, in the field of the image sensor, a pixel may refer to a sensing element and a value sensed by the sensing element, interchangeably. However, in the present specification, for clarity of description, a pixel is basic unit information constituting an image, and a sensing element is a hardware element that outputs a pixel value of a corresponding pixel in response to light being received from a subject.

For example, a pixel value of each pixel may be determined based on a sensing of a single sensing element, or a sensing of a plurality of sensing elements grouped by binning. By performing a binning process, photosensitivity of the imaging device 100 and/or the image sensor 120 may be enhanced, and an image quality may be increased even in a low illuminance. Although there is a limitation to an amount of light that may be sensed by a single sensing element, sensitivity may be enhanced by representing one pixel using values sensed by a plurality of sensing elements. The image sensor 120 may group sensing elements of the sensing array 121. Grouping of sensing elements will be described below with reference to FIG. 4.

The image sensor 120 may include the sensing array 121, an optical filter 122 (e.g., a color filter array), and a condensing lens array 123. However, the embodiments are not limited thereto, and the optical filter 122 may also be implemented integrally with the condensing lens array 123 including an individual condensing microlens 123a that has an optical characteristic of passing a predetermined wavelength band and blocking the remaining wavelength bands.

The condensing lens array 123 may include a plurality of condensing microlenses to concentrate light passing through the imaging lens 110 to the sensing array 121. For example, a number of condensing microlenses included in the condensing lens array 123 may be equal to a number of sensing elements included in the sensing array 121. The plurality of condensing microlenses 123a may be disposed between imaging optical lens 110 and the sensing array 121 and may transmit light passing through the imaging optical lens 110 to sensing elements 121a corresponding to respective condensing microlenses 123a by concentrating the light in the sensing elements 121a. For example, as illustrated in FIG. 2, a condensing microlens 123a may be disposed on each sensing element 121a of the sensing array 121 to concentrate light in the sensing element 121a disposed thereunder. In addition, as illustrated in FIG. 2, a color pass filtering element 122a may be disposed between each condensing microlens 123a and each sensing element 121a.

The optical filter 122 may be a filter that has an optical characteristic of passing a predetermined wavelength band and blocking the remaining wavelength bands. The optical filter 122 may include one or more color filters. Each color filter may receive light passing through a corresponding imaging lens and transmit light corresponding to a wavelength of a single color (e.g., one of red, blue and green) among the received light. For example, the optical filter 122 may be implemented as a color filter array (CFA) including a plurality of color filters 122-1 and 122-2 disposed along a filter plane. Each color filter may include one or more color pass filtering elements 122a. A color filter may be a set of a plurality of color pass filtering elements or a color pass filtering element having an area covering a sensing region. Each color pass filtering element 122a may be a filter that passes light of a wavelength band corresponding to a predetermined color and blocks light of the remaining bands. Each color pass filtering element 122a may include, for example, a red pass filtering element, a green pass filtering element, and a blue pass filtering element. The red pass filtering element may pass light of a wavelength band corresponding to red and block light of the remaining bands. The green pass filtering element may pass light of a wavelength band corresponding to green and block light of the remaining bands. The blue pass filtering element may pass light of a wavelength band corresponding to blue and block light of the remaining bands.

A quality of an image captured and restored by the image sensor 120 may be determined based on the number of sensing elements included in the sensing array 121 and an amount of light incident on the respective sensing elements 121a. For example, a resolution of an image may be determined based on the number of sensing elements included in the sensing array 121, a sensitivity of the image may be determined based on an amount of light incident on the respective sensing elements 121a, and the amount of incident light may be determined based on the size of the sensing elements 121a or a binning size. As the size of the sensing elements 121a or the binning size increases, the amount of incident light may increase, and a dynamic range of the sensing array 121 may increase. Thus, as the number of sensing elements included in the sensing array 121 increases, the image sensor 120 may capture a high-resolution image. In response to an increase in the size of the sensing elements 121a and/or the binning size, the image sensor 120 may advantageously operate to capture an image having a high sensitivity in a low illuminance.

The sensing element 121a may sense an intensity value of received light as sensing information. The imaging device 100 may determine intensity information corresponding to an original signal related to points included in a field of view (FOV) of the imaging device 100 based on sensing information output from the sensing array 121, and may restore the captured image based on the determined intensity information.

The sensing element 121a may generate a color intensity value corresponding to a desired color as the sensing information by sensing light passing through the color filter 122a. Each of the plurality of sensing elements 121a constituting the sensing array 121 may be disposed to sense a color that is identical to or different from that sensed by a neighboring sensing element that is spatially adjacent thereto.

Figure 3:
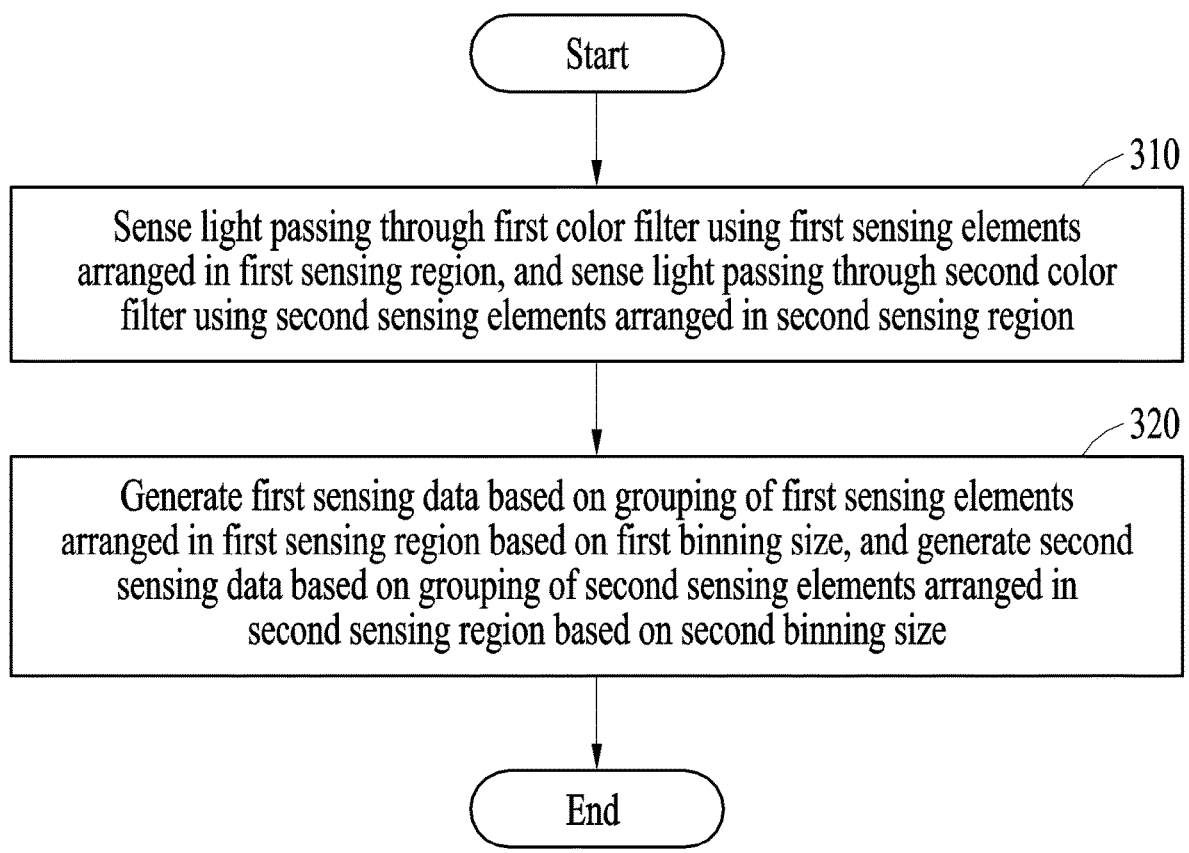
FIG. 3 is a flowchart illustrating an example of a method of operating an image sensor according to an embodiment.

An example of a method of operating the image sensor 120 to perform a dynamic binning will be described below with reference to FIG. 3. FIG. 3 is a flowchart illustrating an example of a method of operating an image sensor according to an embodiment.

In operation 310, the image sensor (e.g., the image sensor 120 of FIG. 1) may sense light passing through a first color filter (e.g., the color filter 122-1 of FIG. 1) using first sensing elements arranged in a first sensing region, and sense light passing through a second color filter (e.g., the color filter 122-2 of FIG. 1) using second sensing elements arranged in a second sensing region. The first sensing region may be a region of a sensing array (e.g., the sensing array 121 of FIG. 1) that light passing through the first color filter reaches. The second sensing region may be a region of the sensing array that light passing through the second color filter reaches.

In operation 320, the image sensor may generate first sensing data based on a grouping of the first sensing elements arranged in the first sensing region based on a first binning size, and may generate second sensing data based on a grouping of the second sensing elements arranged in the second sensing region based on a second binning size. Sensing data may include sensing values summed based on binning.

The first sensing data may include a sensing value obtained by summing intensity values (e.g., color intensity values) sensed by the first sensing elements grouped based on the first binning size. The second sensing data may include a sensing value obtained by summing intensity values sensed by the second sensing elements grouped based on the second binning size. The image sensor may perform an analog binning to sum analog sensing signals sensed by grouped sensing elements. The analog binning may be performed, for example, in an amplifier stage.

According to an embodiment, a processor of the image sensor may restore an image (e.g., a captured image) from the sensing data. The processor of the image sensor may restore a first image corresponding to a first FOV based on the first sensing data. The processor of the image sensor may restore a second image corresponding to a second FOV which extends past the first FOV, based on the first sensing data and the second sensing data. In other words, in an example, the image sensor may restore images (e.g., a first image or a second image) corresponding to different FOVs (e.g., a first FOV, or a second FOV) from one color filter array and one sensing array. An example of image restoration by the processor will be described below with reference to FIGS. 6 to 7B.

Figure 4:
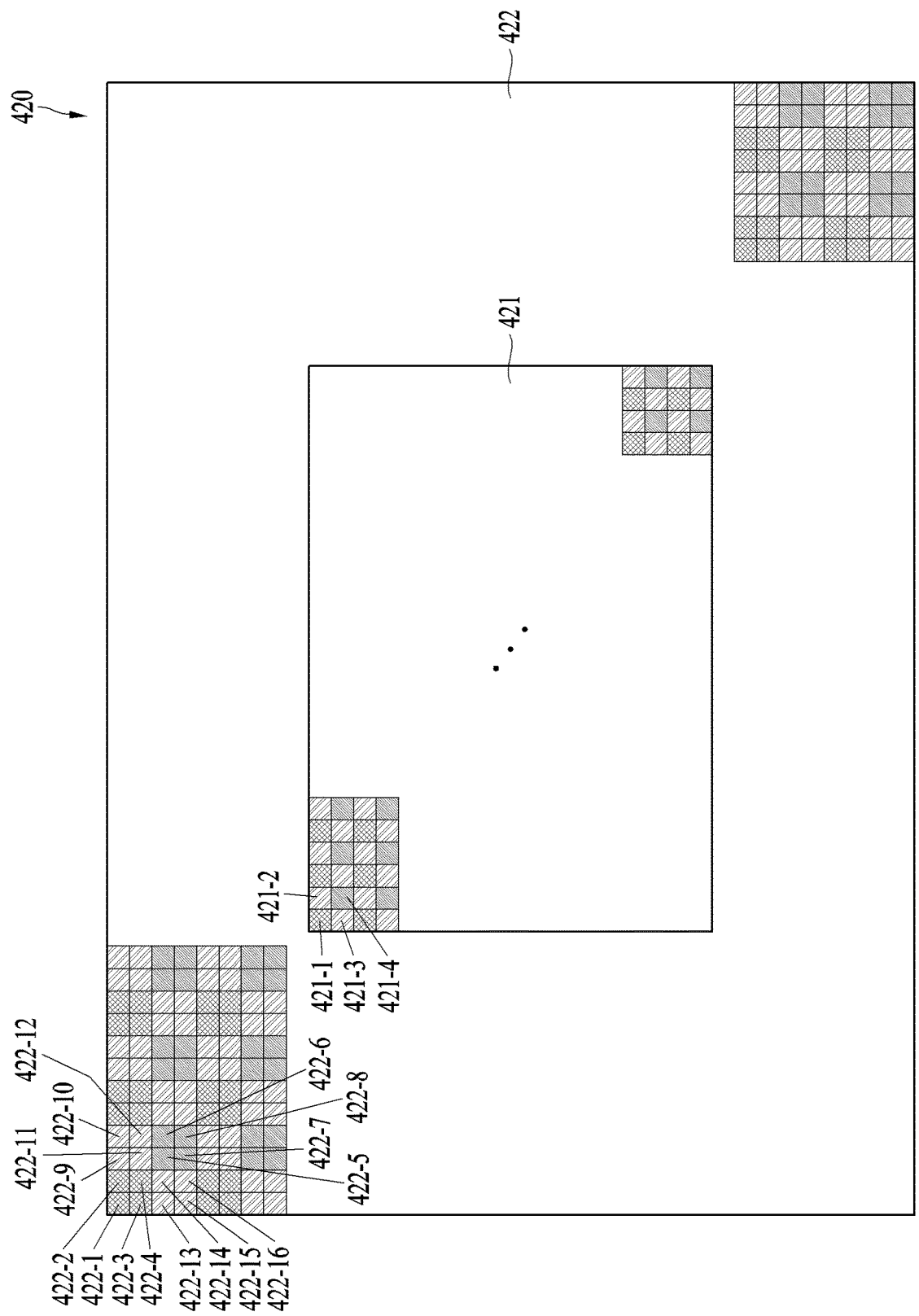
FIG. 4 illustrates an example of a structure of a color filter array of an image sensor according to an embodiment.

FIG. 4 illustrates an example of a structure of a color filter array of an image sensor according to an embodiment.

According to an embodiment, a color filter array 420 (e.g., the color filter array 122 of FIG. 1) of the image sensor (e.g., the image sensor 120 of FIG. 1) may include a first color filter 421, and a second color filter 422.

In the first color filter 421, a first pattern including a first number of blue pass filtering elements, the first number of red pass filtering elements, and a number of green pass filtering elements twice the first number may be repeatedly disposed. The first number may be "$a^2(a \times a)$", and "a" may be an integer greater than or equal to "1". In an example, the first pattern may be a pattern in which a first blue pass filtering element set and a first red pass filtering element set are diagonally arranged and two first green pass filtering element sets may be off-diagonally arranged, however, the embodiments are not limited thereto. The first blue pass filtering element set may include "$a^2$" blue pass filtering elements, that is, "a" blue pass filtering elements may be arranged along one axis (e.g., a horizontal axis) of the color filter array 420, and "a" blue pass filtering elements may be arranged along another axis (e.g., a vertical axis) intersecting the one axis. Similarly, the first red pass filtering element set may include "a²" red pass filtering elements, that is, "a" red pass filtering elements may be arranged along the one axis, and "a" red pass filtering elements may be arranged along the other axis. The first green pass filtering element set may include "a²" green pass filtering elements, that is, "a" green pass filtering elements may be arranged along the one axis, and "a" green pass filtering elements may be arranged along the other axis. For example, if "a" is "1", the first pattern may be a Bayer pattern, but is not limited thereto. In the example FIG. 4 in which "a" is "1", a pattern including one blue pass filtering element 421-1, one red pass filtering element 421-4, and two green pass filtering elements 421-2 and 421-3 is repeatedly disposed in the first color filter 421.

In the second color filter 422, a second pattern including a second number of blue pass filtering elements, the second number of red pass filtering elements, and a number of green pass filtering elements twice the second number may be repeatedly disposed. The second color filter 422 may enclose or surround the area of the first color filter 421 of the color filter 420. The second number may be greater than the first number. In other words, the second number may be "b²(b×b)", and "b" may be an integer greater than or equal to "2" and greater than the above-described "a". In an example, the second pattern may be a pattern in which a second blue pass filtering element set and a second red pass filtering element set are diagonally arranged and two second green pass filtering element sets may be off-diagonally arranged, however, the embodiments are not limited thereto. The second blue pass filtering element set may include "b²" blue pass filtering elements, that is, "b" blue pass filtering elements may be arranged along one axis (e.g., a horizontal axis) of the color filter array 420, and "b" blue pass filtering elements may be arranged along another axis (e.g., a vertical axis) intersecting the one axis. Similarly, the second red pass filtering element set may include "b²" red pass filtering elements, that is, "b" red pass filtering elements may be arranged along the one axis, and "b" red pass filtering elements may be arranged along the other axis. The second green pass filtering element set may include "b²" green pass filtering elements, that is, "b" green pass filtering elements may be arranged along the one axis, and "b" green pass filtering elements may be arranged along the other axis. In the example FIG. 4 in which "b" is "2", a pattern including four blue pass filtering elements 422-1, 422-2, 422-3, and 422-4, four red pass filtering elements 422-5, 422-6, 422-7, and 422-8, and eight green pass filtering elements 422-9, 422-10, 422-11, 422-12, 422-13, 422-14, 422-15, and 422-16 is repeatedly disposed in the second color filter 422.

Figure 5:
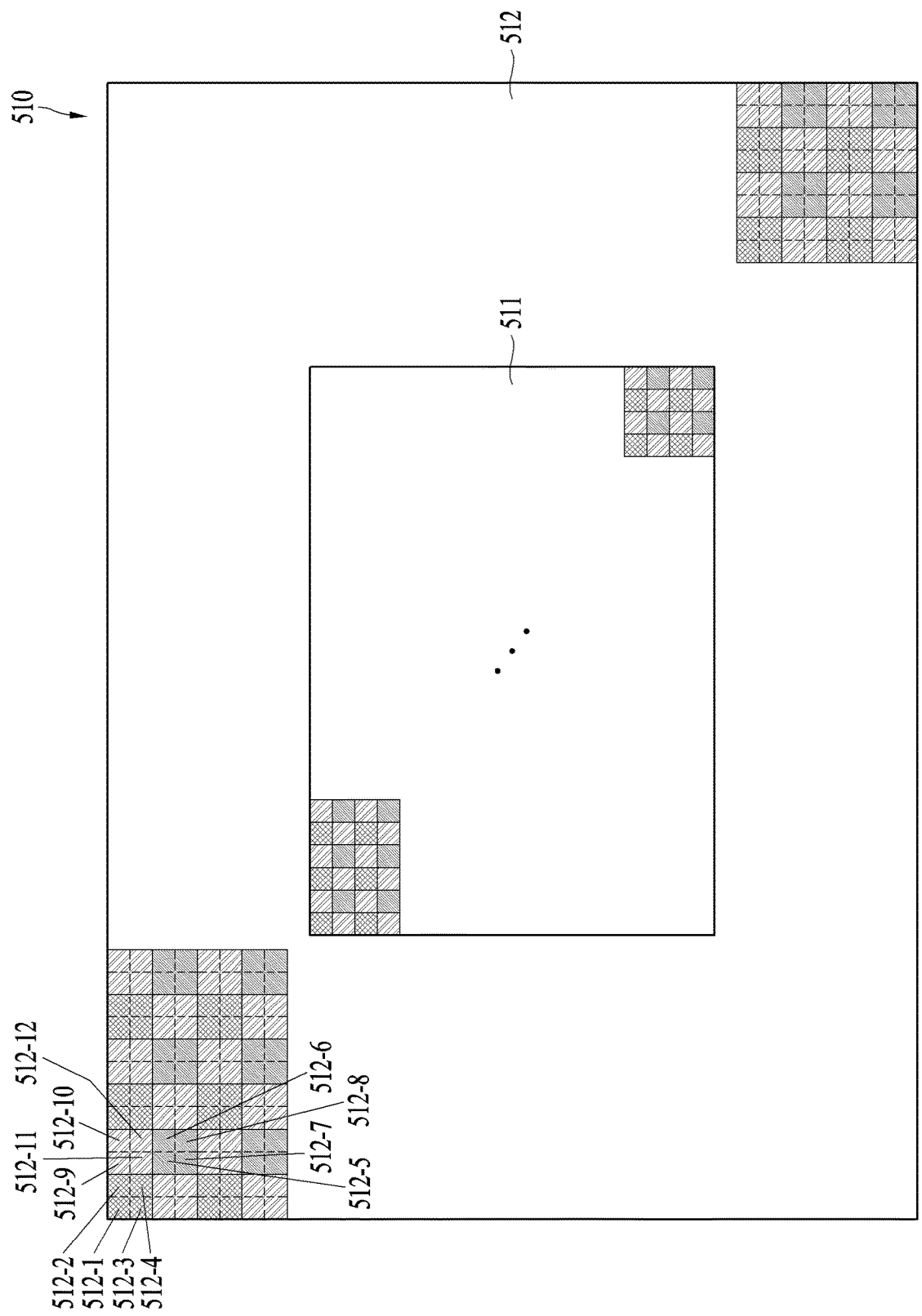
FIG. 5 illustrates an example of a binning operation of an image sensor according to an embodiment.

FIG. 5 illustrates an example of a binning operation of an image sensor according to an embodiment.

In an example, a controller of the image sensor (e.g., the image sensor 120 of FIG. 1) may select a binning size (e.g., "1×1", "2×2", "3×3", or "4×4") to be applied for each sensing region. A binning size may be expressed by a product of a number of sensing elements grouped along one axis (e.g., a horizontal axis) of a sensing array 510 and a number of sensing elements grouped along another axis (e.g., a vertical axis) intersecting the one axis, however, the embodiments are not limited thereto.

In an example, the controller of the image sensor may group sensing elements arranged in a sensing region based on a binning size determined based on a pattern of a color filter corresponding to the sensing region. The binning size to be applied may vary depending on each sensing region. A region of the sensing array 510 of the image sensor may include a first sensing region 511 that light passing through a first color filter reaches, and a second sensing region 512 that light passing through a second color filter reaches.

The controller of the image sensor may group first sensing elements arranged in the first sensing region 511 based on a first binning size determined based on a first pattern of a first color filter (e.g., the first color filter 421 of FIG. 4) corresponding to the first sensing region 511. The controller may determine the first binning size to be a size corresponding to a first number indicating a number of blue pass filtering elements or red pass filtering elements included in the first pattern. For example, when the first number is "a²(a×a)", the controller of the image sensor may select "a×a" as the first binning size to be applied to the first sensing region 511. However, when the first number is 1 (i.e., when "a" is "1"), the image sensor may exclude an analog binning operation for the first sensing elements. In other words, when "a" is "1", the image sensor may not need to group the first sensing elements because a neighboring sensing element that senses light of a wavelength of the same color is absent.

According to an embodiment, the controller of the image sensor may perform "a×a" analog binning on the first sensing elements arranged in the first sensing region 511. The controller of the image sensor may sum intensity values sensed by "a²" first sensing elements by performing the "a×a" analog binning. The controller of the image sensor may group first sensing elements that sense light of a wavelength of the same color (e.g., one of red, blue, and green). In other words, the image sensor may perform an analog binning to sum analog sensing signals sensed by the "a²" first sensing elements. However, in the example of FIG. 5 in which the first number is "1", the controller of the image sensor may exclude an analog binning operation for the first sensing elements arranged in the first sensing region 511.

Similarly, the controller of the image sensor may group second sensing elements arranged in the second sensing region 512 based on a second binning size determined based on a second pattern of the second color filter (e.g., the second color filter 422 of FIG. 4) corresponding to the second sensing region 512. The controller may determine the second binning size to be a size corresponding to a second number indicating a number of blue pass filtering elements or red pass filtering elements included in the second pattern. For example, when the second number is "b²(b×b)", the controller of the image sensor may represent the second binning size to be applied to the second sensing region 512 as "b×b".

According to an embodiment, the controller of the image sensor may perform a "b×b" analog binning on the second sensing elements arranged in the second sensing region 512. The controller of the image sensor may sum intensity values sensed by "b²" second sensing elements by performing the "b×b" analog binning. The controller of the image sensor may group second sensing elements that sense light of a wavelength of the same color (e.g., one of red, blue, and green). In other words, the image sensor may perform an analog binning to sum analog sensing signals sensed by the "b²" second sensing elements. However, in the example of FIG. 5 in which the number of binned sensing elements is "4(2²)", the controller of the image sensor may exclude a 2×2 analog binning operation for the second sensing elements arranged in the second sensing region 512. For example, the controller of the image sensor may group four second sensing elements 512-1, 512-2, 512-3, and 512-4 that sense light of a blue wavelength, may group four second sensing elements 512-5, 512-6, 512-7, and 512-8 that sense light of a red wavelength, and may group four second sensing elements 512-9, 512-10, 512-11, and 512-12 that sense light of a green wavelength.

Figure 6:
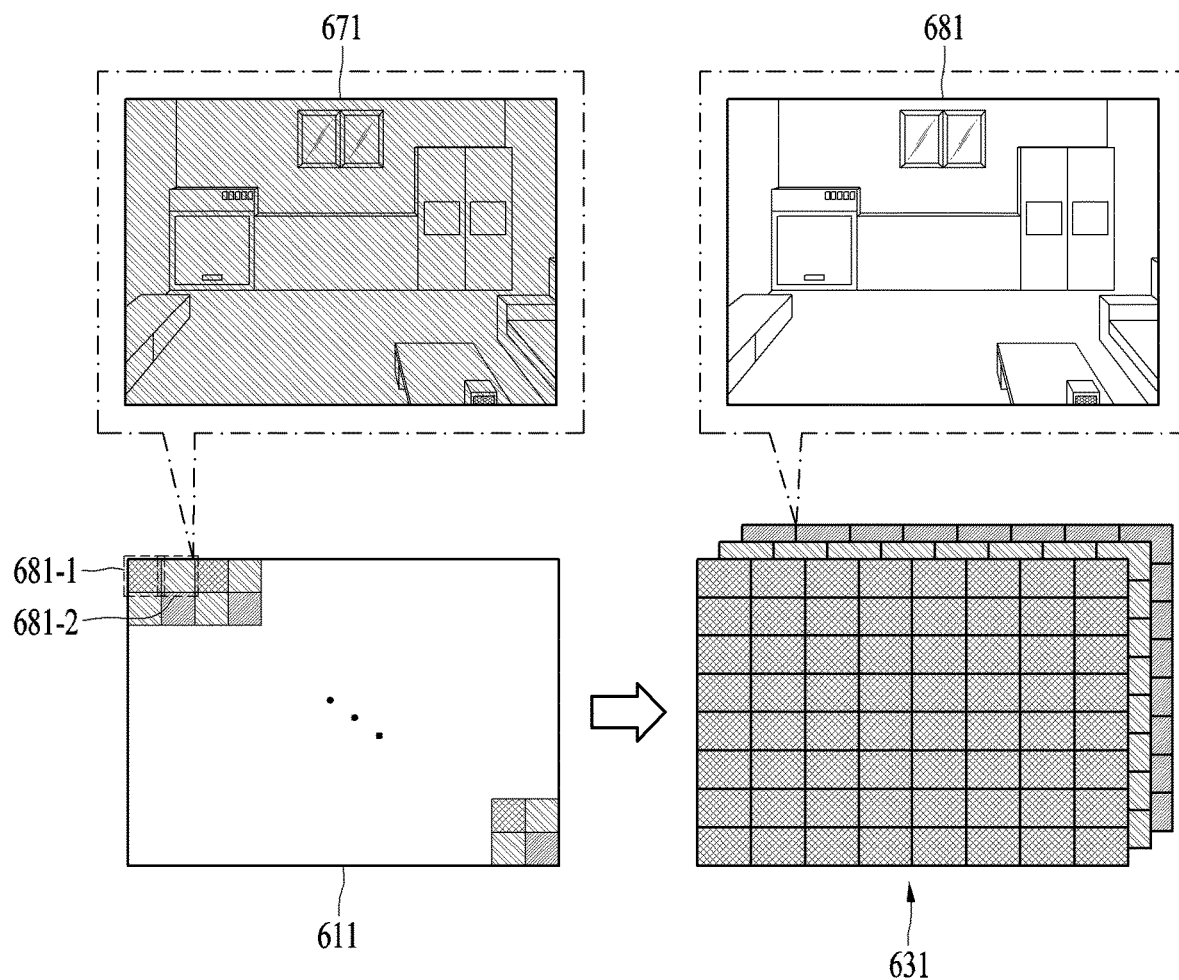
FIG. 6 is a diagram illustrating a process by which an image sensor restores a first image corresponding to a first field of view (FOV) according to an embodiment.

FIG. 6 is a diagram illustrating a process by which an image sensor restores a first image corresponding to a first FOV according to an embodiment.

The image sensor may generate first sensing data based on a grouping of first sensing elements arranged in a first sensing region 611 based on a first binning size (e.g., "a×a"). The image sensor may restore a first image 681 (e.g., a captured image) corresponding to the first FOV based on the first sensing data. The first image 681 may include first pixels, and sizes of the first pixels may correspond to sizes of sensing elements grouped based on the first binning size. The image sensor may determine pixel values of first pixels (e.g., a first pixel 681-1, and a second pixel 681-2) constituting the first image 681 based on the first sensing data.

For example, the image sensor may group the first sensing elements arranged in the first sensing region 611 based on the first binning size, and may determine a pixel value of a first pixel constituting the first image 681 corresponding to the first FOV, based on a sensing value obtained by summing intensity values sensed by the grouped first sensing elements. For one first pixel (e.g., the first pixel 681-1) constituting the first image 681, the image sensor may determine a pixel value of the one first pixel (e.g., the first pixel 681-1), from a sum of intensity value sensed by first sensing elements grouped corresponding to the one first pixel.

Since a controller of the image sensor groups sensing elements that sense light of a wavelength of the same color, the image sensor may obtain a color intensity value corresponding to a single color for each first pixel. Thus, a pixel value of a first pixel obtained based on a binning, where a is "1", may indicate only a single color intensity value. The image sensor may generate the first image 681 from the pixel values of the first pixels. An operation of obtaining channel images 631 for each color channel (e.g., a red color channel, a blue color channel, and a green color channel) from the pixel values of the first pixels may also be referred to as "demosaicing". The image sensor may restore the first image 681 by generating channel images for each color channel from the pixel values of the first pixels.

In an example, if an image is a color image, the image may have color values that are based on a color system as pixel values, but it may be difficult for the image sensor to simultaneously sense three colors at a single point due to a physical limitation. The image sensor may interpolate a color intensity value (e.g., a color intensity value corresponding to blue) that fails to be obtained by a first pixel (e.g., a first pixel that obtains a color intensity value corresponding to red) disposed in a predetermined position, based on a color intensity value that is sensed by another first pixel (e.g., a first pixel that obtains a color intensity value corresponding to blue) disposed around the first pixel. For example, the image sensor may perform the above-described interpolation on each of the pixel values of the first pixels. However, the embodiments are not limited thereto, and the image sensor may restore the channel images 631 based on a machine learning model (e.g., a neural network) that is implemented to output the channel images 631 for each color channel in response to an input of an intermediate image 671 in which color values are mixed for each of positions of the first pixels. Here, the intermediate image 671 and the channel images 631 may have the same resolution. In another example, the image sensor may also restore the channel images 631 from the intermediate image 671, using a filtering-based image processing scheme. The image sensor may obtain three color channel images 631, one for each color channel. The image sensor may restore the first image 681 including a plurality of color channel images 631. However, the above-described restoration of channel images for each color channel is merely an example, and other methods may also be performed depending on a design.

Figure 7A:
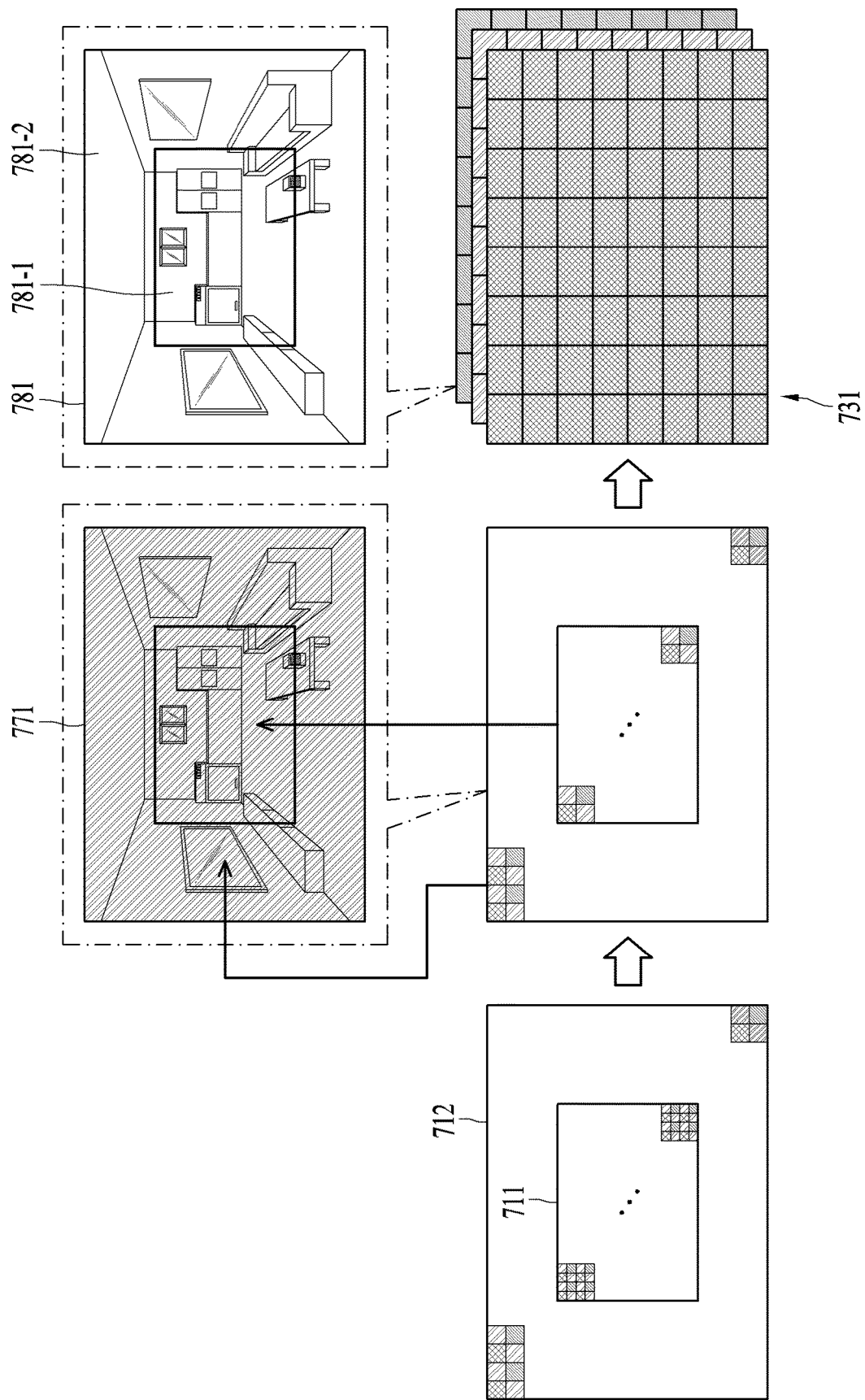
FIGS. 7A and 7B are diagrams illustrating a process by which an image sensor restores a second image corresponding to a second FOV according to an embodiment.
Figure 7B:
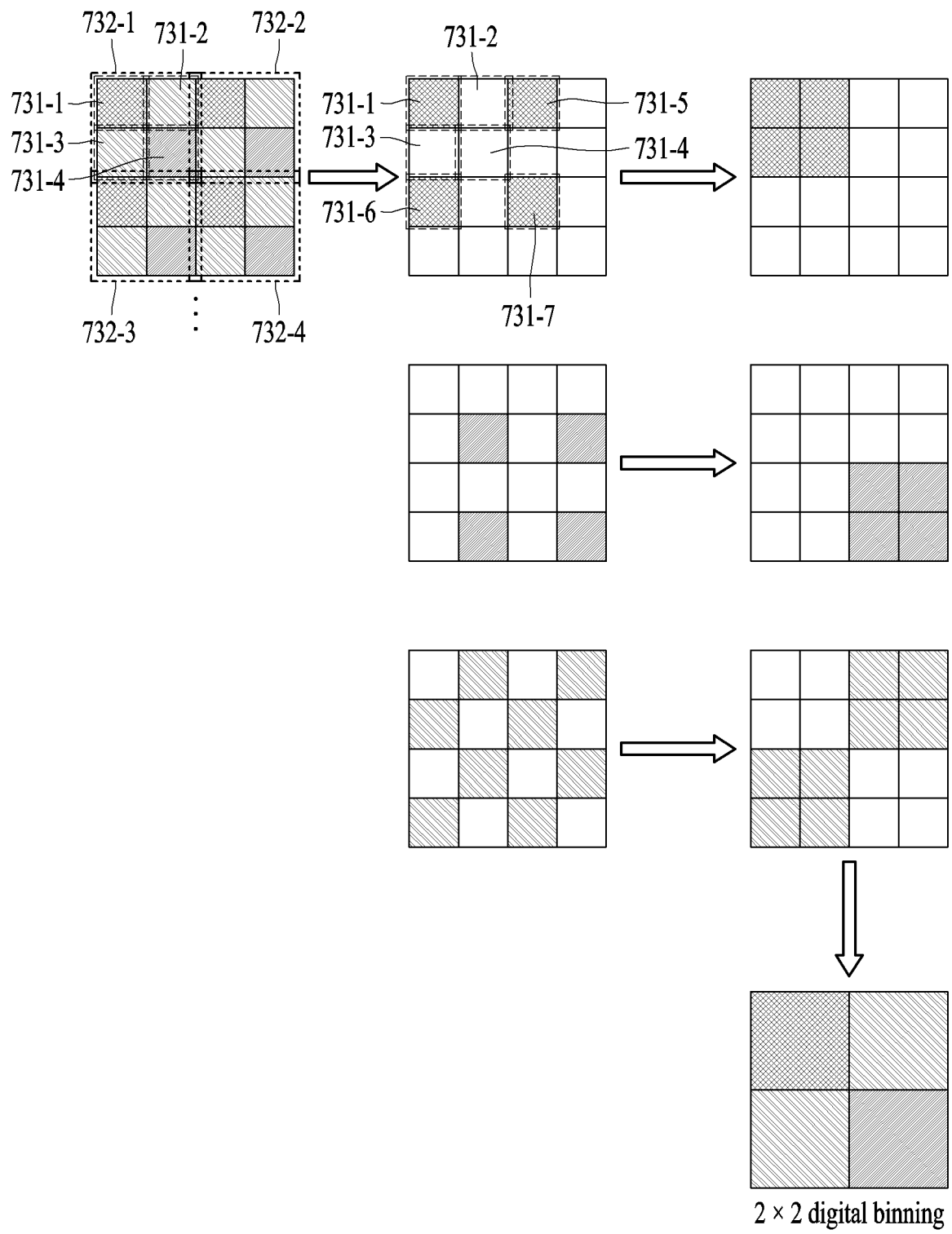

FIGS. 7A and 7B are diagrams illustrating a process by which an image sensor restores a second image corresponding to a second FOV according to an embodiment.

The image sensor may generate first sensing data based on a grouping of first sensing elements arranged in a first sensing region 711 based on a first binning size (e.g., "a×a"), and may generate second sensing data based on a grouping of second sensing elements arranged in a second sensing region 712 based on a second binning size (e.g., "b×b"). The image sensor may restore a second image 781 (e.g., a captured image) corresponding to the second FOV based on the first sensing data and the second sensing data. The second image 781 may include second pixels, and sizes of the second pixels may correspond to sizes of sensing elements grouped based on second binning size.

The second image 781 may include a first partial image 781-1 corresponding to the first sensing region 711, and a second partial image 781-2 corresponding to the second sensing region 712. The image sensor may determine pixel values of second pixels constituting the first partial image 781-1 based on the first sensing data, and determine pixel values of second pixels constituting the second partial image 781-2 based on the second sensing data.

The image sensor may determine the pixel values of the second pixels constituting the first partial image 781-1 by performing a binning on the first sensing elements arranged in the first sensing region 711 based on the second binning size. The image sensor may determine pixel values of first pixels based on a grouping of the first sensing elements based on the first binning size (e.g., "a×a"), and may determine the pixel values of the second pixels constituting the first partial image 781-1 by performing a color interpolation on the pixel values of the first pixels and performing a digital binning on the first pixels.

For example, the image sensor may group the first sensing elements based on the first binning size (e.g., "a×a") and may perform an analog binning to sum analog sensing signals sensed by the grouped first sensing elements. The image sensor may determine a sensing value obtained by summing intensity values sensed by the first sensing elements grouped based on the first binning size, as a pixel value of a first pixel. The image sensor may determine the pixel values of the second pixels constituting the first partial image 781-1 based on the pixel values of the first pixels.

A process of restoring the first partial image 781-1 by the image sensor is described with reference to FIG. 7B. The image sensor may group the first sensing elements arranged in the first sensing region 711 based on the first binning size (e.g., "a×a") and may generate a first pixel (e.g., first pixels 731-1, 731-2, and 731-3) corresponding to the first sensing elements grouped based on the first binning size. A size of a first pixel may correspond to a size of each of sensing elements grouped based on the first binning size (e.g., "a×a"). The image sensor may determine a sensing value obtained by summing intensity values sensed by the first sensing elements grouped based on the first binning size as a pixel value of one first pixel corresponding to the grouped first sensing elements. Since a controller of the image sensor groups first sensing elements that sense light of a wavelength of the same color based on the first binning size, one first pixel corresponding to the grouped first sensing elements may obtain a color intensity value corresponding to a single color as a pixel value. However, it may be difficult to simultaneously obtain color intensity values corresponding to three colors.

The first pixel 731-1 may obtain a color intensity value corresponding to blue as a pixel value, and the first pixels 731-2 and 731-3 may obtain a color intensity value corresponding to green as a pixel value. A first pixel 731-4 may obtain a color intensity value corresponding to red as a pixel value.

The image sensor may determine pixel values of the second pixels (e.g., second pixels 732-1, 732-2, 732-3, and 732-4) constituting the first partial image 781-1, based on pixel values of first pixels (e.g., the first pixels 731-1, 731-2, 731-3, and 731-4). The image sensor may perform a color interpolation on the pixel values of the first pixels and perform a digital binning on the first pixels, to determine the pixel values of the second pixels (e.g., the second pixels 732-1, 732-2, 732-3, and 732-4) constituting the first partial image 781-1.

The image sensor may determine a pixel value of one second pixel (e.g., the second pixel 732-1) constituting the first partial image 781-1 based on pixel value of first pixels (e.g., the first pixels 731-1, 731-2, 731-3, and 731-4) corresponding to the one second pixel (e.g., the second pixel 732-1).

For example, the image sensor may identify first pixels (e.g., the first pixels 731-1, 731-2, 731-3, and 731-4) corresponding to one second pixel (e.g., the second pixel 732-1) constituting the first partial image 781-1. The first pixels (e.g., the first pixels 731-1, 731-2, 731-3, and 731-4) corresponding to the second pixel (e.g., the second pixel 732-1) may be first pixels corresponding to a sensing region of the corresponding second pixel. One second pixel (e.g., the second pixel 732-1) may indicate one color (e.g., blue). In other words, a pixel value of one second pixel (e.g., the second pixel 732-1) may indicate only a single color intensity value.

The image sensor may calculate an intensity value (e.g., a blue intensity value) of a color indicated by a second pixel (e.g., the second pixel 732-1) for each of the first pixels (e.g., the first pixels 731-1, 731-2, 731-3, and 731-4) corresponding to the second pixel (e.g., the second pixel 732-1) The image sensor may distinguish a first pixel (e.g., the first pixel 731-1) that obtains an intensity value of a color (e.g., blue) indicated by a second pixel (e.g., the second pixel 732-1) as a pixel value from a first pixel (e.g., the first pixel 731-2, 731-3, or 731-4) that obtains an intensity value of a color (e.g., red or green) other than the color indicated by the second pixel (e.g., the second pixel 732-1) as a pixel value, among the identified first pixels (e.g., the first pixels 731-1, 731-2, 731-3, and 731-4) corresponding to the second pixel (e.g., the second pixel 732-1). For a first pixel (e.g., the first pixel 731-2) that obtains an intensity value of a color other than a color indicated by a second pixel as a pixel value, the image sensor may interpolate an intensity value of a color (e.g., blue) indicated by a second pixel, based on a pixel value of another first pixel (e.g., the first pixel 731-1, or 731-5) disposed around the first pixel (e.g., the first pixel 731-2). The pixel value of the other first pixel may correspond to the intensity value of the color (e.g., blue) indicated by the second pixel (e.g., the second pixel 732-1). For example, one first pixel being around another first pixel may indicate that the one first pixel is in contact with the other first pixel or is disposed at a position diagonal to the other first pixel.

In the example of FIG. 7B, the second pixel 732-1 may indicate blue. The image sensor may distinguish the first pixel 731-1 that obtains a blue intensity value as a pixel value from the first pixels 731-2, 731-3, and 731-4 that obtain intensity values of colors (e.g., red or green) other than blue as pixel values, among the identified first pixels 731-1, 731-2, 731-3, and 731-4 corresponding to the second pixel 732-1. The image sensor may interpolate a blue intensity value of the first pixel 731-2 based on pixel values of other first pixels 731-1 and 731-5 that are disposed around the first pixel 731-2 and that obtain blue intensity values as pixel values. In an example, the image sensor may determine the blue intensity value of the first pixel 731-2 as an average value of the blue intensity value of the first pixel 731-1 and a blue intensity value of the first pixel 731-5. In another example, the image sensor may determine a blue intensity value of the first pixel 731-3 as an average value of the blue intensity value of the first pixel 731-1 and a blue intensity value of a first pixel 731-6. The image sensor may determine a blue intensity value of the first pixel 731-4 as an average value of the blue intensity value of the first pixel 731-1, the blue intensity value of the first pixel 731-5, the blue intensity value of the first pixel 731-6, and a blue intensity value of a first pixel 731-7. The image sensor may calculate all the blue intensity values of the identified first pixels 731-1, 731-2, 731-3, and 731-4 corresponding to the second pixel 732-1.

In addition, the image sensor may determine a pixel value of one second pixel (e.g., the second pixel 732-1) by performing a digital binning on the identified first pixels (e.g., the first pixels 731-1, 731-2, 731-3, and 731-4) corresponding to the second pixel (e.g., the second pixel 732-1) to sum digital intensity values of a color indicated by the second pixel (e.g., the second pixel 732-1). In an example, the image sensor may perform a digital binning on first pixels based on a binning size corresponding to a value obtained by dividing the second binning size (e.g., "b×b") by the first binning size (e.g., "a×a"), to determine a pixel value of a second pixel. In this example, the binning size corresponding to the value obtained by dividing the second binning size (e.g., "b×b") by the first binning size (e.g., "a×a") may be represented by $$\frac{b}{a} \times \frac{b}{a}.$$

As described above, a size of one second pixel may correspond to a size of each of sensing elements grouped based on the second binning size (e.g., "b×b"), and a size of one first pixel may correspond to a size of each of sensing elements grouped based on the first binning size (e.g., "a×a"). Thus, the image sensor may perform an analog binning on first sensing elements arranged in a first sensing region based on the first binning size, and may perform a digital binning based on the binning size corresponding to the value obtained by dividing the second binning size by the first binning size, to determine a pixel value of a second pixel. In the example of FIG. 7B, the image sensor may determine a pixel value (e.g., a blue intensity value) of the second pixel 732-1 by performing a digital binning to sum blue intensity values of the first pixels 731-1, 731-2, 731-3, and 731-4. The image sensor may perform a "2×2" digital binning on the first pixels.

Referring back to FIG. 7A, the image sensor may determine the pixel values of the second pixels constituting the first partial image 781-1 based on the pixel values of the first pixels. In addition, the image sensor may determine the pixel values of the second pixels constituting the second partial image 781-2 based on the second sensing data. The image sensor may group the second sensing elements arranged in the second sensing region 712 based on the second binning size, and may determine the pixel values of the second pixels constituting the second partial image 781-2 from a sensing value obtained by summing intensity values sensed by the grouped second sensing elements. The image sensor may determine the pixel values of the second pixels constituting the second partial image 781-2 by performing only an analog binning to sum analog sensing signals sensed by the second sensing elements grouped based on the second binning size, instead of needing to additionally perform a color interpolation or digital binning.

The image sensor may restore the second image 781 by generating channel images for each color channel from the pixel values of the second pixels. For example, the image sensor may restore channel images 731 for each color channel from an intermediate image 771 in which color values are mixed for each of positions of the second pixels. The image sensor may restore the second image 781 including the channel images 731 for each color channel.

Figure 8A:
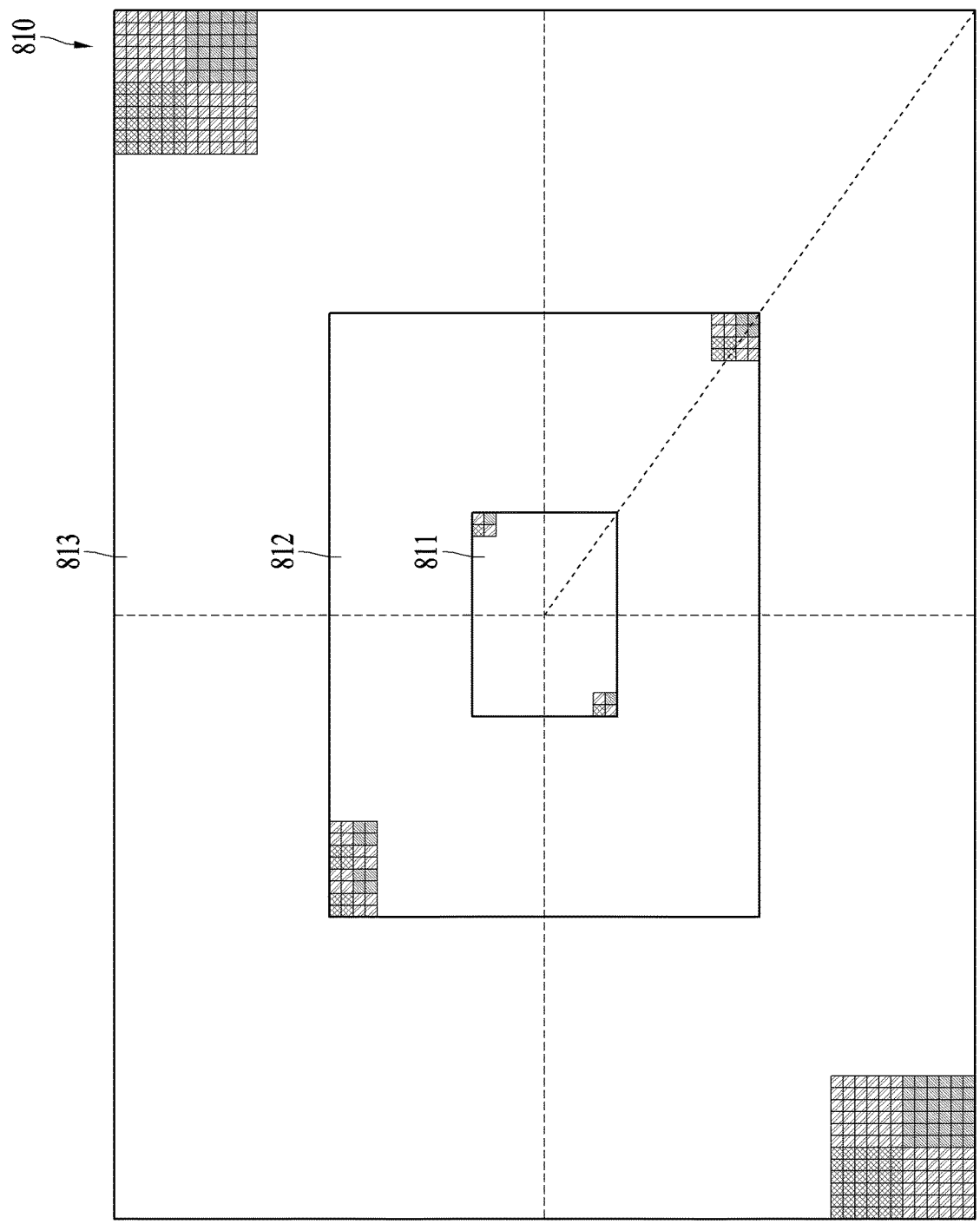
FIGS. 8A to 8C illustrate a process by which an image sensor restores images corresponding to three FOVs according to an embodiment.
Figure 8B:
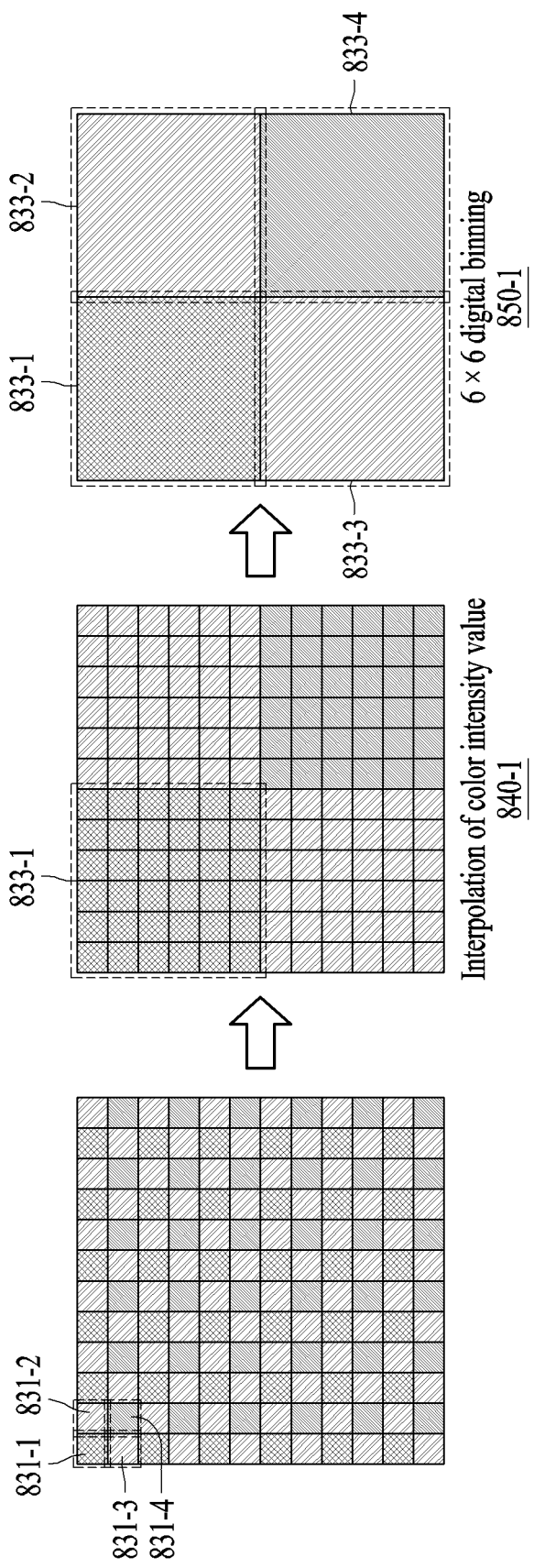
Figure 8C:
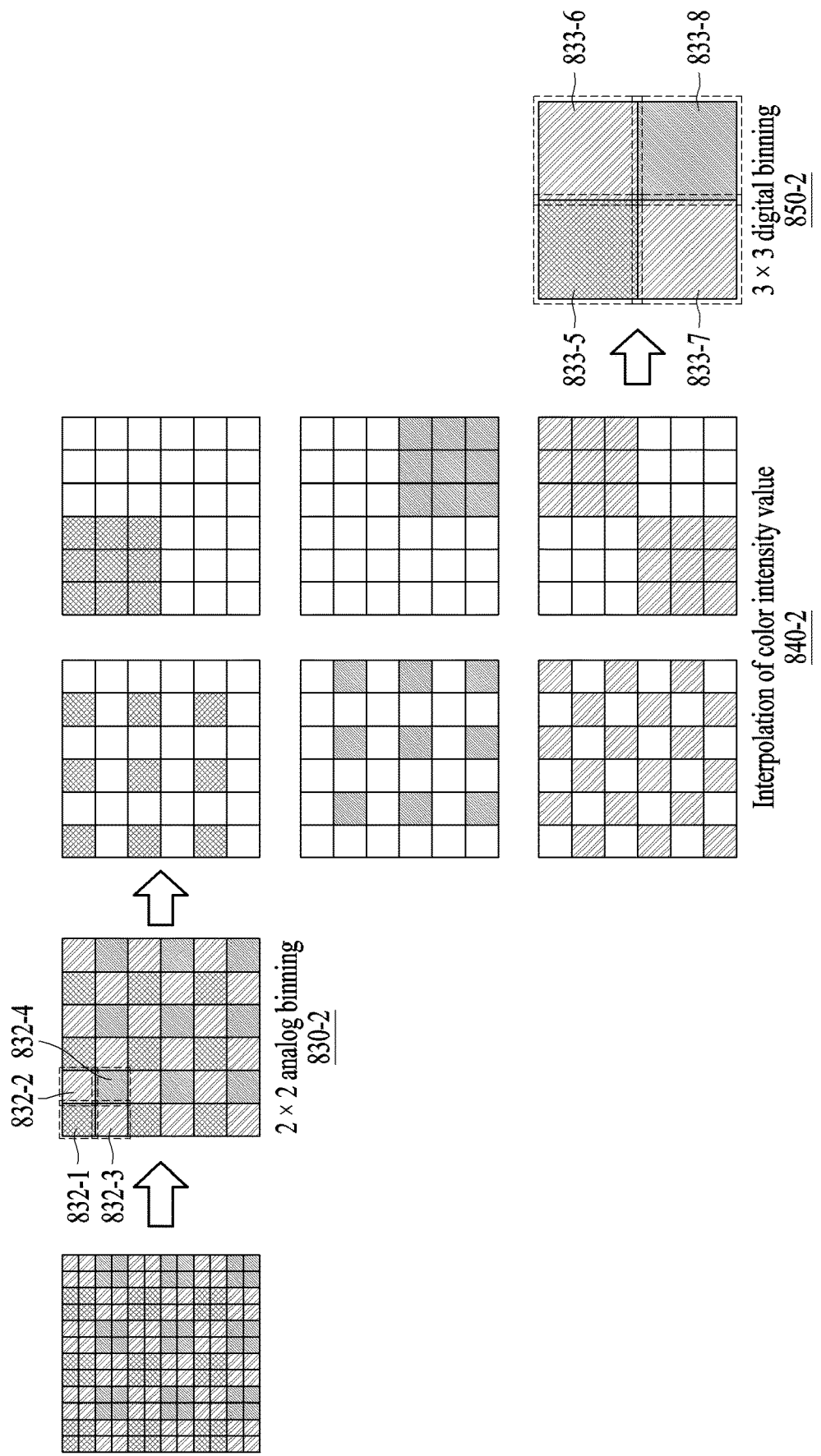

FIGS. 8A to 8C illustrate a process by which an image sensor restores images corresponding to three FOVs according to an embodiment. FIG. 8A illustrates a structure in which a color filter array of the image sensor includes three color filters.

A color filter array 810 of the image sensor may include a first color filter 811 (e.g., the first color filter 421 of FIG. 4), a second color filter 812 (e.g., the second color filter 422 of FIG. 4), and a third color filter 813, however, the embodiments are not limited thereto. In another example, the image sensor may include at least four color filters. The color filter array 810 of the image sensor may include a plurality of color filters. If a distance between a color filter and a center point of the color filter array decreases, a number of filtering elements included in a pattern of the color filter may decrease. Hereinafter, for convenience of description, an example in which the color filter array 810 of the image sensor includes three color filters will be mainly described.

The third color filter 813 may surround the area of second color filter 812 in the filter 810. In the third color filter 813, a third pattern including a third number of blue pass filtering elements, the third number of red pass filtering elements, and a number of green pass filtering elements twice the third number may be repeatedly disposed. The third number may be greater than a first number that is a number of blue or red pass filtering elements included in a first pattern of the first color filter 811, and a second number that is a number of blue or red pass filtering elements included in a second pattern of the second color filter 812. The third number may be "$c^2(c \times c)$", and "$c$" may be an integer greater than or equal to "3". In the example of FIG. 8A in which "$c$" is "6", a pattern including "36" blue pass filtering elements, "36" red pass filtering elements, and "72" green pass filtering elements is repeatedly disposed in the third color filter 813.

A sensing array of the image sensor may include first sensing elements arranged in a first sensing region that receives light passing through the first color filter 811, second sensing elements arranged in a second sensing region that receives light passing through the second color filter 812, and third sensing elements arranged in a third sensing region that receives light passing through the third color filter 813. A processor of the image sensor may generate first sensing data based on a grouping of first sensing elements based on a first binning size, may generate second sensing data based on a grouping of second sensing elements based on a second binning size, and may generate third sensing data based on a grouping of third sensing elements based on a third binning size. Here, the third binning size may be expressed as "$c \times c$".

The image sensor may generate first sensing data based on a grouping of first sensing elements based on a first binning size, may generate second sensing data based on a grouping of second sensing elements based on a second binning size, and may generate third sensing data based on a grouping of third sensing elements based on a third binning size. The processor of the image sensor may restore a first image corresponding to a first FOV based on the first sensing data, and may restore a second image corresponding to a second FOV based on the first sensing data and the second sensing data. An operation of restoring the first image and the second image has been described above, and accordingly further description is not repeated herein.

The image sensor may restore a third image corresponding to a third FOV based on the first sensing data, the second sensing data, and the third sensing data. According to an embodiment, in the image sensor, the third image may include third pixels, and sizes of the third pixels may correspond to sizes of sensing elements grouped based on the third binning size. The third image may include a first partial image corresponding to the first sensing region, a second partial image corresponding to the second sensing region, and a third partial image corresponding to the third sensing region.

According to an embodiment, to restore an image corresponding to a predetermined FOV, the image sensor may perform an analog binning on sensing elements corresponding to an outermost color filter among color filters used to restore the image, instead of additionally performing a color interpolation or digital binning. The image sensor may perform an analog binning on sensing elements corresponding to color filters other than the outermost color filter among the color filters used to restore the image, and may additionally perform an interpolation and digital binning. For example, to restore the third image corresponding to the third FOV, the image sensor may perform only an analog binning on sensing elements corresponding to the third color filter 813 at an outermost portion among color filters (e.g., the first color filter 811, the second color filter 812, and the third color filter 813) used to restore the third image, instead of additionally performing an interpolation and digital binning. In this example, the image sensor may perform an analog binning on sensing elements corresponding to the first color filter 811 and the second color filter 812 and may additionally perform an interpolation and digital binning.

For example, the image sensor may determine pixel values of third pixels constituting the first partial image of the third image corresponding to the first sensing region, based on the first sensing data. Referring to FIG. 8B, the image sensor may group first sensing elements arranged in the first sensing region 811 based on a first binning size (e.g., "$a \times a$") and may generate first pixels (e.g., first pixels 831-1, 831-2, and 831-3) corresponding to the first sensing elements grouped based on the first binning size. The image sensor may determine a sensing value obtained by summing intensity values sensed by the first sensing elements grouped based on the first binning size as a pixel value of one first pixel corresponding to the grouped first sensing elements. The image sensor may perform a color interpolation 840-1 on pixel values of the first pixels. The image sensor may interpolate an intensity value of a color (e.g., blue) indicated by a third pixel (e.g., a third pixel 833-1) corresponding to a first pixel (e.g., the first pixel 831-2), based on pixel values of the other first pixels. The image sensor may determine pixel values of third pixels (e.g., third pixels 833-1, 833-2, 833-3, and 833-4) constituting the first partial image of the third image by performing a digital binning on the first pixels. The image sensor may perform a "6×6" digital binning 850-1 on the first pixels.

In another example, the image sensor may determine pixel values of third pixels constituting the second partial image of the third image corresponding to the second sensing region, based on the second sensing data. Referring to FIG. 8C, the image sensor may group second sensing elements arranged in the second sensing region based on a second binning size (e.g., "b×b") and may generate second pixels (e.g., second pixels 832-1, 832-2, 832-3, and 832-4) corresponding to the second sensing elements grouped based on the second binning size. The image sensor may determine a sensing value obtained by summing intensity values sensed by the second sensing elements grouped based on the second binning size as a pixel value of one second pixel corresponding to the grouped second sensing elements. The image sensor may perform a color interpolation 840-2 on pixel values of the second pixels. In addition, the image sensor may determine pixel values of third pixels (e.g., third pixels 833-5, 833-6, 833-7, and 833-8) constituting the second partial image of the third image by performing a digital binning on the second pixels. The image sensor may perform a "3×3" digital binning 850-2 on the third pixels.

In another example, the image sensor may determine pixel values of third pixels constituting the third partial image of the third image corresponding to the third sensing region, based on the third sensing data. The image sensor may group third sensing elements arranged in the third sensing region based on a third binning size. The image sensor may determine a sensing value obtained by summing intensity values sensed by the third sensing elements grouped based on the third binning size as a pixel value of one third pixel corresponding to the grouped third sensing elements. In other words, the image sensor may determine pixel values of the third pixels constituting the third partial image of the third image by performing an analog binning on the third sensing elements, instead of needing to additionally perform an interpolation or digital binning.

Figure 9:
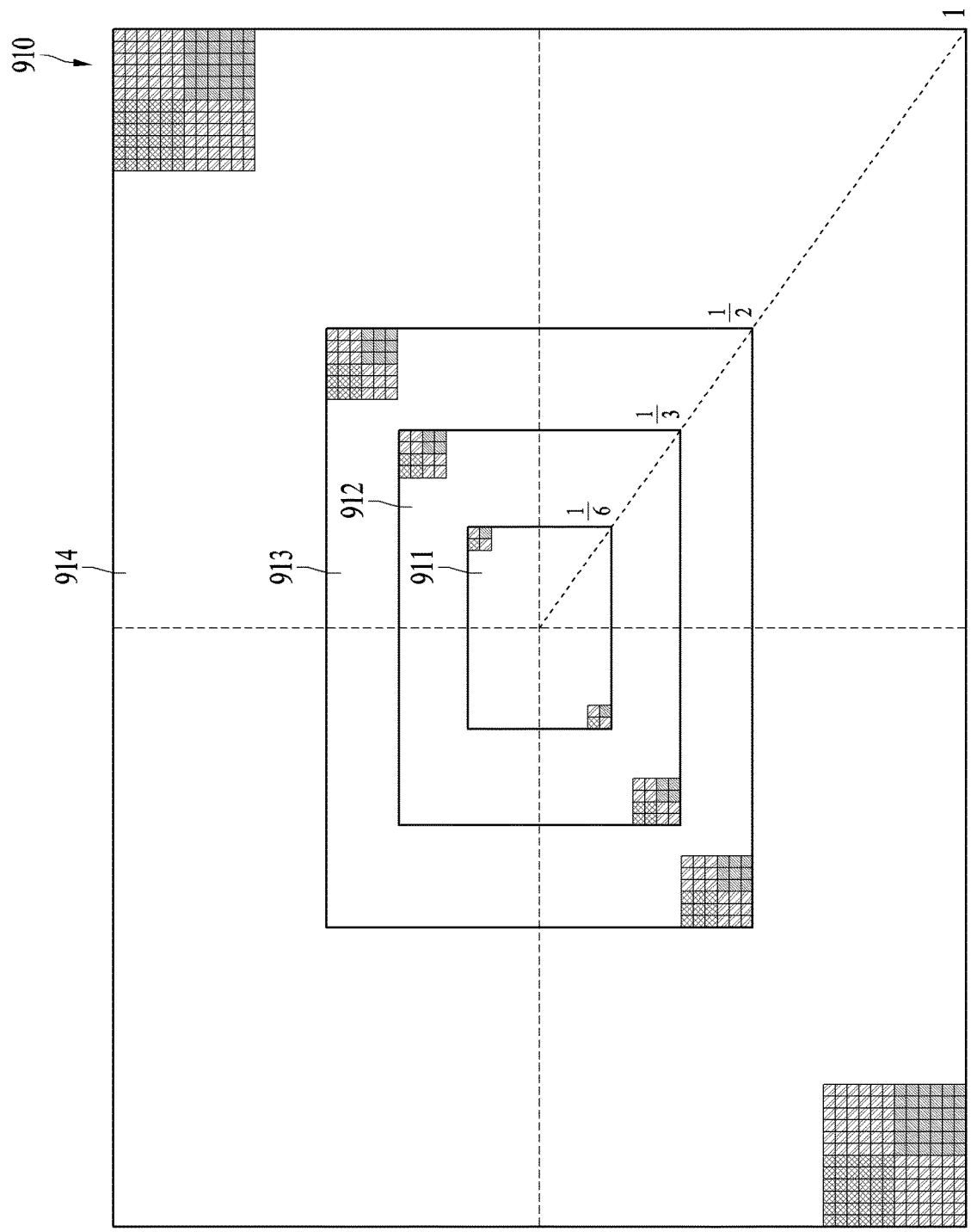
FIG. 9 is a diagram illustrating a resolution of an image restored by an image sensor according to an embodiment.

FIG. 9 is a diagram illustrating a resolution of an image restored by an image sensor according to an embodiment.

According to an embodiment, a color filter array 910 of the image sensor may include a plurality of color filters 911, 912, 913, and 914. A resolution of an image restored by the image sensor may be determined based on a number of sensing elements arranged in a sensing region and a binning size.

According to an embodiment, all images corresponding to a plurality of FOVs restored by the image sensor may have the same resolution, however, the embodiments are not limited thereto. According to an embodiment, a size of each of color filters in the image sensor may be determined such that all the images corresponding to the plurality of FOVs may have the same resolution.

For example, referring to FIG. 9, a first pattern of the first color filter 911 may be a pattern including one blue pass filtering element, one red pass filtering element, and two green pass filtering elements. A second pattern of the second color filter 912 may be a pattern including four blue pass filtering elements, four red pass filtering elements, and eight green pass filtering elements. A third pattern of the third color filter 913 may be a pattern including nine blue pass filtering elements, nine red pass filtering elements, and "18" green pass filtering elements. A fourth pattern of the fourth color filter 914 may be a pattern including "36" blue pass filtering elements, "36" red pass filtering elements, and "72" green pass filtering elements.

The image sensor may restore a first image corresponding to a first FOV, using first sensing elements arranged in a first sensing region of a sensing array that light passing through the first color filter 911 reaches. The image sensor may restore a second image corresponding to a second FOV, using the first sensing elements, and second sensing elements that are arranged in a second sensing region corresponding to the second color filter 912. The image sensor may restore a third image corresponding to a third FOV, using the first sensing elements, the second sensing elements, and third sensing elements that are arranged in a third sensing region corresponding to the third color filter 913. The image sensor may restore a fourth image corresponding to a fourth FOV, using the first sensing elements, the second sensing elements, the third sensing elements, and fourth sensing elements that are arranged in a fourth sensing region corresponding to the fourth color filter 914. Here, the first FOV<the second FOV<the third FOV<the fourth FOV may be satisfied.

According to an embodiment, a resolution of an image may be determined based on a number of sensing elements arranged in a sensing region and a binning size. The resolution of the image may be determined based on a value obtained by dividing a number of sensing elements arranged in a sensing region used to restore the image by a binning size that is to be applied to an outermost sensing region. In other words, the resolution of the image may be determined based on a number of pixels constituting the image.

For example, when the image sensor is capable of obtaining sensing data of "12" megapixels (MP) in total from the first sensing region, the first image may have a resolution of "12" MP because binning is not performed in the first sensing region. For example, a total number of filtering elements included in the second color filter 912 and the first color filter 911 may be four times a number of filtering elements included in the first color filter 911. In this example, a total size of the first sensing region and the second sensing region may be four times a size of the first sensing region, and accordingly the image sensor may obtain sensing data of "48 (12×4)" MP in total from the first sensing region and the second sensing region. However, since the image sensor needs to perform a "2×2" binning in the first sensing region and the second sensing region to restore the second image, the second image may have a resolution of "12" MP (=48 MP/4). In another example, a total number of filtering elements included in the third color filter 913, the second color filter 912, and the first color filter 911 may be nine times the number of filtering elements included in the first color filter 911 in the image sensor. In this example, a total size of the first sensing region, the second sensing region, and the third sensing region may be nine times the size of the first sensing region, and accordingly the image sensor may obtain sensing data of "108 (12×9)" MP in total from the first sensing region, the second sensing region, and the third sensing region. However, since the image sensor needs to perform a "3×3" binning in each of the first sensing region, the second sensing region, and the third sensing region to restore the third image, the third image may have a resolution of "12" MP (=108 MP/9). In another example, a total number of filtering elements included in the fourth color filter 914, the third color filter 913, the second color filter 912, and the first color filter 911 may be "36" times the number of filtering elements included in the first color filter 911 in the image sensor. In this example, a total size of the first sensing region, the second sensing region, the third sensing region, and the fourth sensing region may be "36" times the size of the first sensing region, and accordingly the image sensor may obtain sensing data of "432 (12×36)" MP in total from the first sensing region, the second sensing region, the third sensing region, and the fourth sensing region. However, since the image sensor needs to perform a "6×6" binning in each of the first sensing region, the second sensing region, the third sensing region, and the fourth sensing region to restore the fourth image, the fourth image may have a resolution of "12" MP (=432 MP/36).

According to an embodiment, the image sensor may perform an analog binning and a digital binning to restore an image. The image sensor 910 designed as shown in FIG. 9 may have an area ratio for each sensing region, as shown in Table 1 below.

TABLE 1

|  | Fourth sensing region | Third sensing region | Second sensing region | First sensing region |
| --- | --- | --- | --- | --- |
| Fourth image | 75.0% | 13.8% | 8.3% | 2.7% |
| Third image |  | 55.5% | 33.3% | 11.1% |
| Second image |  |  | 75.0% | 25.0% |
| First image |  |  |  | 100% |

To restore the fourth image corresponding to the fourth FOV, the image sensor may use all the first color filter 911, the second color filter 912, the third color filter 913, and the fourth color filter 914. Referring to Table 1, the first sensing region may occupy 2.7%, the second sensing region may occupy 8.3%, the third sensing region may occupy 13.8%, and the fourth sensing region may occupy 75%. Accordingly, the image sensor may need to perform only an analog binning on the fourth sensing elements arranged in the fourth sensing region, and additionally perform a color interpolation and digital binning on the remaining sensing elements. In other words, to restore the fourth image, it may be sufficient to perform only the analog binning on 75% of the sensing elements, and the image sensor may need to additionally perform the color interpolation and digital binning on the remaining 25% of the sensing elements.

To restore the second image corresponding to the second FOV, the image sensor may use only the first color filter 911 and the second color filter 912. Referring to Table 1, the second sensing region may occupy 75% and the first sensing region may occupy 25%. In other words, to restore the second image, it may be sufficient to perform only the analog binning on 75% of the sensing elements, and the image sensor may need to additionally perform the color interpolation and digital binning on the remaining 25% of the sensing elements.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

What is claimed is:

1. An image sensor, comprising:
 a color filter array comprising:
  a first color filter comprising a first number of blue pass filtering elements, the first number of red pass filtering elements, and green pass filtering elements arranged in a first pattern, wherein a number of green pass filtering elements in the first pattern is twice the first number, and a second color filter comprising a second number of blue pass filtering elements, the second number of red pass filtering elements, and green pass filtering elements arranged in a second pattern, wherein a number of green pass filtering elements in the second pattern is twice the second number, and wherein the second number is greater than the first number;

a sensing array comprising first sensing elements arranged in a first sensing region configured to receive light passing through the first color filter, and second sensing elements arranged in a second sensing region configured to receive light passing through the second color filter; and a processor configured to generate sensing data based on a sensing of the first sensing elements and a sensing of the second sensing elements, wherein the second color filter surrounds an area of the first color filter, wherein the processor is further configured to restore a first image corresponding to a first field of view (FOV) based on first sensing data corresponding to the sensing of the first sensing elements, and restore a second image corresponding to a second FOV that extends further than the first FOV, based on the first sensing data and second sensing data corresponding to the sensing of the second sensing elements, and wherein in restoring the first image, the processor is configured to:

determine pixel values of first pixels constituting the first image from a sensing value obtained by summing intensity values sensed by the first sensing elements grouped based on a first binning size;

generate channel images for each color channel from the pixel values of the first pixels; and restore the first image using the channel images.

2. The image sensor of claim 1, wherein the processor is configured to:

group the first sensing elements based on the first binning size determined based on the first pattern of the first color filter; and group the second sensing elements based on a second binning size determined based on the second pattern of the second color filter.

3. The image sensor of claim 2, wherein the processor is configured to:

generate the first sensing data based on the grouped first sensing elements based on the first binning size; and generate the second sensing data based on the grouped second sensing elements based on the second binning size.

4. The image sensor of claim 3, wherein the first sensing data comprises a sensing value obtained by summing intensity values sensed by the first sensing elements grouped based on the first binning size, and the second sensing data comprises a sensing value obtained by summing intensity values sensed by the second sensing elements grouped based on the second binning size.

5. The image sensor of claim 1, wherein the second image comprises a first partial image corresponding to the first sensing region, and a second partial image corresponding to the second sensing region, and in restoring the second image, the processor is configured to:

determine pixel values of first pixels based on the grouping of the first sensing elements based on the first binning size, identify second pixels corresponding to sets of plural first pixels which form part of the first partial image, and determine pixel values of the second pixels by performing a color interpolation on the pixel values of the first pixels and performing a digital binning on the first pixels;

determine pixel values of second pixels which form part of the second partial image based on the grouping of the second sensing elements based on the second binning size; and restore the second image by generating channel images for each color channel from the determined pixel values of the second pixels in the first partial image and the second partial image.

6. The image sensor of claim 5, wherein in determining pixel values of the second pixels in a region of the first partial image, the processor is configured to:

identify one set of first pixels corresponding to one second pixel forming a part of the first partial image; and determine an intensity value of a color indicated by the one second pixel by interpolating a first pixel having a pixel value corresponding to an intensity value of a color other than the color indicated by the one second pixel among the identified one set of first pixels with a pixel value of another first pixel outside of the one set of first pixels and proximate to the first pixel, the pixel value of the another first pixel corresponding to the intensity value of the color indicated by the one second pixel.

7. The image sensor of claim 6, wherein the processor is configured to determine a pixel value of the one second pixel by performing digital binning to sum intensity values of the color indicated by the one second pixel for each of the first pixels corresponding to the one second pixel.

8. The image sensor of claim 7, wherein the processor is configured to determine the pixel values of the second pixels constituting the first partial image by performing a digital binning on the first pixels based on a binning size corresponding to a value obtained by dividing the second binning size by the first binning size.

9. The image sensor of claim 1, wherein the color filter array further comprises a third color filter comprising a third number of blue pass filtering elements, the third number of red pass filtering elements, and green pass filtering elements arranged in a third pattern, wherein a number of green pass filtering elements in the third pattern is twice the third number, and wherein the third number is greater than the second number, the sensing array further comprises third sensing elements arranged in a third sensing region configured to receive light passing through the third color filter, and the third color filter surrounds an area of the second color filter.

10. The image sensor of claim 9, wherein the processor is configured to:

group the third sensing elements based on a third binning size determined based on the third pattern of the third color filter; and generate third sensing data based on the grouping of the third sensing elements based on the third binning size.

11. The image sensor of claim 10, wherein the processor is further configured to restore a third image corresponding to a third FOV, based on first sensing data generated based on a grouping of the first sensing elements based on a first binning size, second sensing data generated based on a grouping of the second sensing elements based on a second binning size, and the third sensing data.

12. The image sensor of claim 11, wherein in restoring the third image the processor is configured to:

determine pixel values of first pixels based on the grouping of the first sensing elements based on the first binning size, and determine pixel values of third pixels corresponding to a first sensing region of the third image by performing a color interpolation on the pixel values of the first pixels and performing a digital binning on the first pixels;

determine pixel values of second pixels based on the grouping of the second sensing elements based on the second binning size, and determine pixel values of third pixels corresponding to a second sensing region of the third image by performing a color interpolation on the pixel values of the second pixels and performing a digital binning on the second pixels; and determine pixel values of third pixels corresponding to a third sensing region of the third image based on the grouping of the third sensing elements based on the third binning size.

13. The image sensor of claim 9, wherein a size of each of the first color filter, the second color filter, and the third color filter is determined such that images corresponding to a plurality of FOVs have a same resolution.

14. The image sensor of claim 1, wherein, when the first number is "1", an analog binning operation of the first sensing elements is excluded.

15. A method performed by an image sensor, the method comprising:

sensing, via a sensor array, light passing through a color filter array, the color filter array comprising a first color filter a first number of blue pass filtering elements, the first number of red pass filtering elements, and green pass filtering elements arranged in a first pattern, wherein a number of green pass filtering elements in the first pattern is twice the first number and a second color filter comprising a second number of blue pass filtering elements, the second number of red pass filtering elements, and green pass filtering elements in a second pattern, wherein a number of green pass filtering elements in the second pattern is twice the second number, and wherein the second number is greater than the first number; and generating, via a processor, first sensing data based on a grouping of first sensing elements arranged in a first sensing region configured to receive light passing through the first color filter, based on a first binning size, and generating second sensing data based on a grouping of second sensing elements arranged in a second sensing region configured to receive light passing through the second color filter, based on a second binning size, wherein the second color filter surrounds an area of the first color filter, and further comprising:

restoring a, via a processor, first image corresponding to a first field of view (FOV) based on the first sensing data; and restoring, via a processor, a second image corresponding to a second FOV that extends further than the first FOV, based on the first sensing data and the second sensing data, and wherein the restoring of the first image comprises determining pixel values of first pixels constituting the first image from a sensing value obtained by summing intensity values sensed by the first sensing elements grouped based on the first binning size, generating channel images for each color channel from the pixel values of the first pixels; and restoring the first image using the channel images.

16. The method of claim 15, wherein the second image comprises a first partial image corresponding to the first sensing region, and a second partial image corresponding to the second sensing region, and the restoring of the second image comprises:

determining pixel values of first pixels based on the grouping of the first sensing elements based on the first binning size, identifying second pixels corresponding to sets of plural first pixels which form part of the first partial image, and determining pixel values of the second pixels by performing a color interpolation on the pixel values of the first pixels and performing a digital binning on the first pixels;

determining pixel values of second pixels which form part of the second partial image based on the grouping of the second sensing elements based on the second binning size; and restoring the second image by generating channel images for each color channel from the determined pixel values of the second pixels in the first partial image and the second partial image.

* * * * *